United States Patent [19]

Baus, Jr.

[11] Patent Number: 5,091,961
[45] Date of Patent: Feb. 25, 1992

[54] MAGNETIC INK CHARACTER DECODER

[75] Inventor: René Baus, Jr., Rancho Palos Verdes, Calif.

[73] Assignee: American Magnetics Corp., Carson, Calif.

[21] Appl. No.: 380,194

[22] Filed: Jul. 14, 1989

[51] Int. Cl.$^5$ .............................................. G06K 9/00
[52] U.S. Cl. ........................................ 382/7; 235/449; 382/18; 382/64
[58] Field of Search ............... 382/7, 29, 34, 64, 12, 382/18; 235/449, 482

[56] References Cited

U.S. PATENT DOCUMENTS

| | | | |
|---|---|---|---|
| Re. 26,744 | 12/1969 | Perotto | 382/12 |
| 3,354,432 | 11/1967 | Lamb | 382/12 |
| 3,571,793 | 3/1971 | Britt | 382/7 |
| 3,577,203 | 5/1971 | Beach | 235/449 |
| 3,629,829 | 12/1971 | Ordower | 382/7 |
| 4,087,789 | 5/1978 | Beery | 382/64 |
| 4,119,946 | 10/1978 | Taylor | 382/34 |
| 4,143,356 | 3/1979 | Nally | 382/7 |
| 4,593,328 | 6/1986 | Baus | 235/482 |

Primary Examiner—Leo H. Boudreau
Attorney, Agent, or Firm—Herbert M. Shapiro

[57] ABSTRACT

A bank check reader operative without the necessity of a constant rate of check movement is achieved by imposing a set of flux reversals over the magnetic ink characters to be read. The flux reversals permit a pulse count sequence to be generated which is unique to each magnetic ink character independent of the rate of check movement.

10 Claims, 2 Drawing Sheets

| SYMBOL | NUMBER | SEQUENCE OF PULSE COUNTS |
|---|---|---|
| ◻ | 0 | 13 - 65 -13 |
| ◻ | 1 | 13 - 13 - 26 |
| ᗡ | 2 | 13 - 26 -13 |
| ⌐ | 3 | 39 - 13 -13 |
| ╘ | 4 | 26 - 26 - 26 |
| ⌐ | 5 | 13 - 39 -13 |
| ⌐ | 6 | 13 - 26 -13 - 13 - 13 |
| ? | 7 | 13 - 13 -13 - 13 - 13 |
| ◻ | 8 | 13 - 13 - 39 - 13 - 13 |
| ⌐ | 9 | 13 - 39 -13 - 13 |
| ◻◻ | 10 | 26 - Null - 39 |
| ◻◻° | 11 | 26 - Null -13 - Null- 26 |
| ◻◻° | 12 | 13 - Null -13 -Null - 39 |
| ◻◻◻ | 13 | 26- Null - 26- Null - 13 |

MAGNETIC INK CHARACTER DECODER

FIELD OF THE INVENTION

This invention relates to apparatus and methods for decoding magnetic ink characters such as appear on blank checks.

BACKGROUND OF THE INVENTION

All blank checks now include a set of magnetically retentive ink characters which are coded representations of the bank and the customer account number. During processing of a check for payment, the character set is decoded automatically by a sophisticated and costly device operative to move the check at a constant rate past a magnetic read head.

Each character in the character set is composed of horizontal, and vertical magnetic elements. For proper decoding, a multiple gap read label is used and check movement is precisely controlled. Typically, the read label includes 28 gaps. Alternatively, auto corrolation decoding techniques are also in use but are relatively expensive and still require uniform movement of the check.

The present invention is directed at the problem of being able to decode the magnetic ink character without moving the check at a constant rate.

BRIEF DESCRIPTION OF THE ILLUSTRATIVE EMBODIMENT OF THIS INVENTION

In accordance with the principles of this invention, a magnetic ink character decoder includes a "read-after-write" head organization. Magnetic flux reversals of relatively small width and aligned vertically are superimposed on the character under the control of a timing wheel which is rotated by engagement with the moving check. All the reversals are spaced apart like distance and no reversals occur between characters (no magnetic ink there).

Since each character of the character set is composed of variations of a set of basic vertical and horizontal elements, a set of signals is generated at the read head which is unique for each character. The signal for each character includes a high amplitude signal for each vertical element in the character and low amplitude signal for each horizontal element where each of the high and low signals includes multiple excursions in the signal because of the superimposed flux reversals and domain walls which are formed at the reversal.

Operation in this manner permits each of a set of characters to be represented by a set of three or more numbers. Each set represents a sequence of high amplitude and low amplitude signal excursions where the number in each instance equals the number of flux reversals. Thus, the "pulse sequence count" for a "0" character is 13-65-13 for flux reversals every 0.001 inch for the bank character now in common use.

The pulse sequence count so generated is obtainable without requiring the movement of the check at a constant rate thus permitting relatively inexpensive, hand held check readers to be used. The pulse sequence count for each magnetic ink character is stored in a look up table and the output of the read head is compared to the counts to find a match.

DETAILED DESCRIPTION OF AN ILLUSTRATIVE EMBODIMENT

Figure 1:
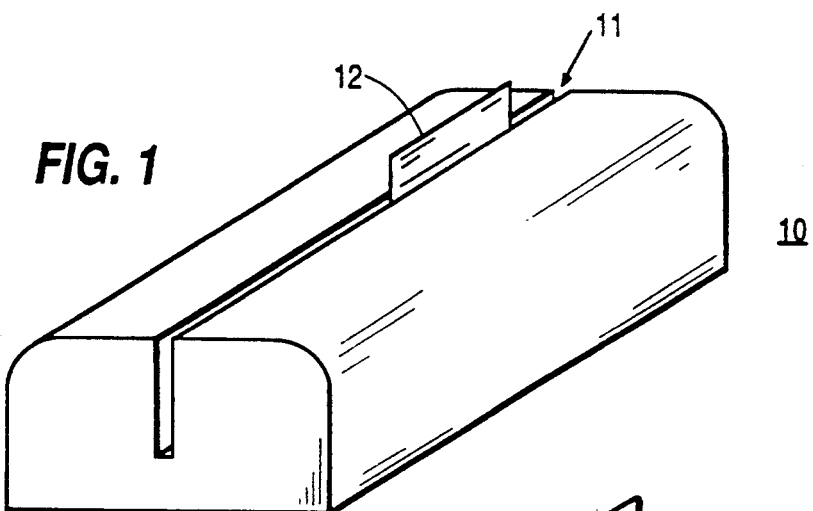
FIG. 1 is a perspective view of a handheld check reader in accordance with the principles of this invention.

FIG. 1 shows an illustrative reader 10 for reading a bank check. The reader includes a slot 11 having dimensions to permit a check to be moved in it by an operator. Reader 10 includes a spring loaded bearing surface (platen not shown) to press the check into contact with operative components shown in FIG. 2.

Reader 10 is dimensioned to be hand held and thus has dimensions typically of less than 8"×4"×3". A check is moved in slot 11 by an operator holding the reader. No instrumentation is provided for moving the check at a uniform rate as is required by prior art check readers. A check 12 is shown in slot 11 of FIG. 1 and positioned for engaging operative elements of the reader in FIG. 2.

Figure 2:
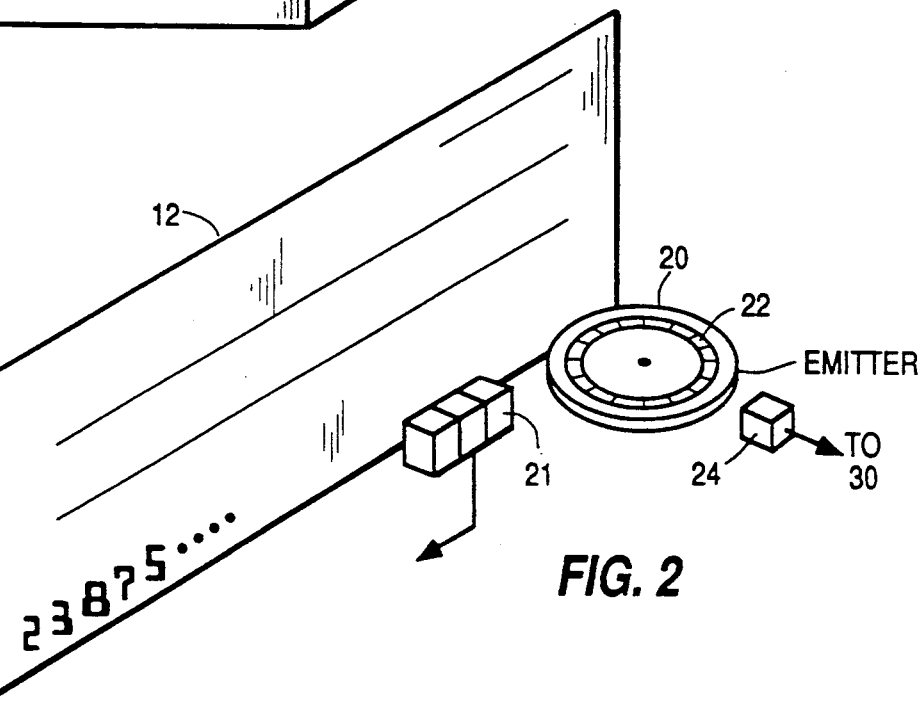
FIG. 2 is a schematic view of a portion of the reader of FIG. 1 showing the juxtaposition of a check and the operative elements of the reader.

Magnetic ink characters are placed in the lower left hand corner of a check as shown in FIG. 2. In accordance with the principles of this invention, closely spaced, vertically oriented flux reversals are superimposed on the characters as the check is moved by the operator forming magnetic domain walls at the reversals. The flux reversals are equally spaced and are unique for each character because each character has a unique arrangement of vertical and horizontal magnetic ink elements as will be discussed more fully below.

Equally-spaced flux reversals are superimposed onto the magnetic ink characters by a timing wheel 20 and by a write head portion of a read-write magnetic head 21. Wheel 20 engages check 12 as it is moved along slot 11 by an operator. The timing wheel, called an emitter, radial marks 22 equally spaced in an annular area set in from its edge. These marks may be magnetic or optical. Timing wheels of this type are disclosed in U.S. Pat. No. 4,593,328. Detector 24 is positioned to count these marks as wheel 20 is rotated by the moving check.

The read-write head is operative in response to the output of detector 24 to write a flux reversal over the advancing characters for each mark counted. Thus, the flux reversals are equally spaced over the characters. A different pulse sequence code results because each character has a unique mix of horizontal and vertical elements over which the flux reversals are written.

Figure 3:
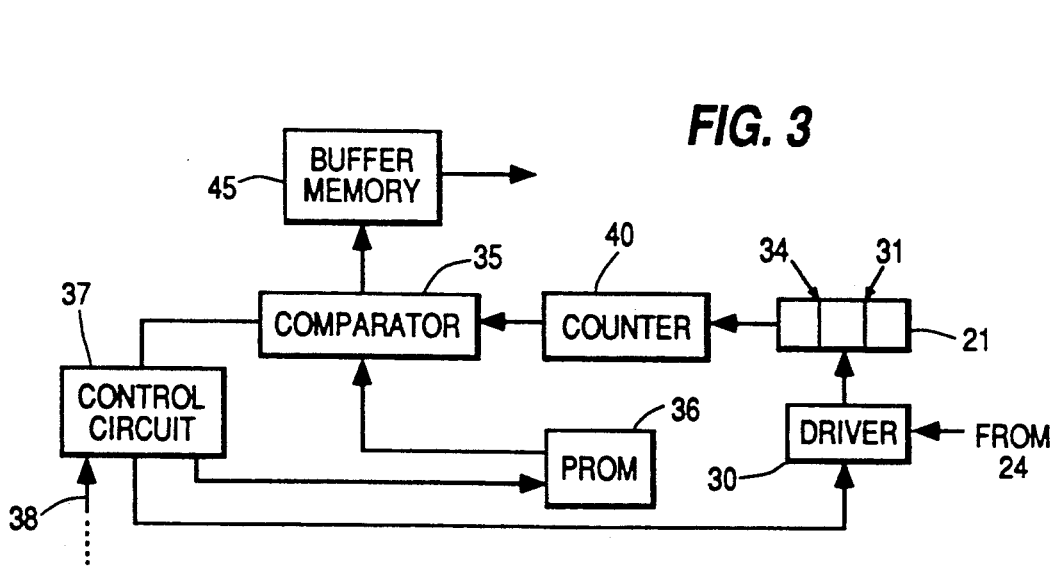
FIG. 3 is a block diagram of the electronic circuitry of the reader of FIG. 1.
Figures 4, 5:
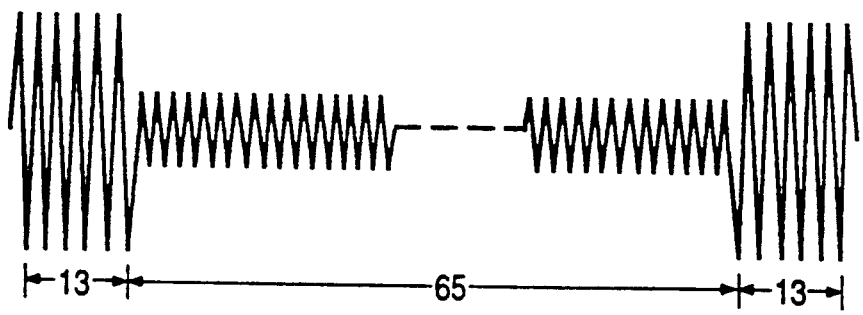
FIG. 4 is a schematic representation of an illustrative output from the reader of FIGS. 1 and 2.
FIG. 5 is a table showing the various stylized characters appearing on a check along with the associated pulse code sequence associated therewith.

FIG. 3 shows a block diagram of a circuit for operating the reader. FIGS. 4 and 5 show a representative output signal and a table of a set of characters and associated pulse sequence counts generated in accordance with the principles of this invention, respectively.

A current driver 30 is connected to the coil of the write head 31 of FIG. 3. The output of detector 24 of FIG. 2 is connected to an input of driver 30. Outputs from detector 24 enable driver 30 to generate currents in the coil of the write head of polarities to generate a succession of flux reversals over the magnetic ink characters. Of course, where there is no magnetic ink no flux reversals appear even though current pulses are generated in the coil of the write head.

The read head 34 of FIG. 3 reads the pattern of flux reversals for the succession of magnetic ink characters on a check being moved along slot 11. The coil of read head 34 is connected to an input to a comparator 35 via a counter as is described more fully below. The output of a PROM 36 also is connected to an input to comparator 35. PROM 36 has stored in it the sequence of pulse counts, shown in the right hand column of the chart of FIG. 5.

FIG. 4 shows a wave form for a representative magnetic ink character "0" having superimposed flux reversals thereon as described above. The wave-form has thirteen large amplitude excursions followed by sixty-five low amplitude excursions followed by thirteen high amplitude excursions (13-65-13) which can be seen in the table of FIG. 5 to represent a "0". The high amplitude excursions correspond to the lengthy vertical elements of the "0". The low amplitude excursions correspond to the top and bottom horizontal elements of the "0". The driver, comparator and PROM are operated under the control of control circuit 37. The control circuit is activated by a signal from a photodiode-photodetector pair (not shown) operative to signal the presence of a check in slot 11 of FIG. 1. This "start" signal appears on line 38 in FIG. 3. Control circuit 37 includes a clock circuit for the proper operation of the various components of the circuit of FIGS. 2 and 3.

It is to be recognized that each number in each pulse sequence of the table of FIG. 5 can be divided by thirteen (the base count). This indicates that the allowable tolerance for the pulse count is ±6 pulses, a rather generous margin which provides accurate character identification even with poor media printing quality.

A continuous stream of pulses is obtained for each character "0" through "9" as long as the gap of the read head is coupled to that character. Hence, the reader of FIG. 1 "knows" where the character begins and ends, a significant advantage. In the case of characters "10", "11", "12", and "13", this is not the case. If such characters are to be read, supplemental electronic logic is employed for decoding.

The function of such supplemental electronic logic is demonstrated by a consideration of the reading of the character "10". This character produces discontinuous sets of pulses as it passes the gap of the read head. The head detects twenty-six pulses, then the amplitude decreases to zero. The electronic logic is designed to respond only to more than a single pulse count and awaits a subsequent count. The following pulse count is thirty-nine, indicating that the character "10" has been read. Logic circuitry operative to this end is straightforward and considered to be included in control circuit 37 of FIG. 3.

The sequence of pulse counts representing each character includes high amplitude and low amplitude pulse counts as was stated hereinbefore. For a "0", the low amplitude pulse counts occur between two high amplitude pulse counts. The positions of the high and low amplitude pulse counts in the sequence of pulse counts representing a particular character depends on the geometry of the character. Thus, a "1" has a sequence of 13-13-26 pulse counts as can be seen from the table of FIG. 5. But in the case of a "1", the middle pulse count is the high amplitude wave form and the beginning an ending pulse counts of the sequence are low amplitude waveforms.

It is important, accordingly, for the circuit of FIG. 3 to respond to a change in waveform amplitude for terminating a pulse count and starting a subsequent pulse count for a particular character being read. To this end, the circuit of FIG. 3 includes a counter 40. The coil of the read head is connected to the input to counter 40 and the output of counter 40 is connected to an input of comparator 35 for comparing the sequence of pulse counts from the comparator. Counter 40 includes an input logic arrangement responsive to a change in waveform amplitude or the absence of pulses to return the counter to zero so that a next pulse count can be initiated.

An examination of characters "0" through "5" indicates that the amplitude of the waveform changes only twice. This leads to a sequence of three pulse counts for any one of these characters. This is not the case for characters "6" through "9". For these characters, four changes in the waveform amplitude occur. This becomes clear if one imagines a vertical line moving sideways through any one of these characters and observing when a change in the amount of magnetic ink under the line occurs.

The sequence for characters "10" through "13" Can be understood in a similar manner. With the character "10", for example, the leading element of the representation of the character (see table of FIG. 5) is twenty-six high amplitude excursions wide, followed by a null, followed by thirty-nine high amplitude excursions. The number of excursions corresponds to the width of the elements of the character along the axis of movement of the check and, of course, the number of flux reversals (0.001 inch wide) which fit within that width.

It is clear that the width of an element of a character determines the pulse count associated with it. Accordingly, the counts represented in FIG. 5 correspond to the stylized characters commonly found on checks. A set of such characters and the dimensions thereof are consistent with the ANSI-E13B character set.

When a match between the output of counter 40 and an entry on PROM 36 is found, comparator 35 provides an output representative of the character for storage in a buffer memory 45 of FIG. 3. The output of memory 45 may be transmitted to a computer for entry of the transaction defined by the check or the buffer memory may be part of the computer.

The common ink characters were designed by an ANSI committee to facilitate stroke identification with two different reading systems then available. One system was based on the use of a multigap magnetic head which detected the presence or absence of different portions of a character. The other system used a single core head which produced a unique waveform for each character. Both these systems are in widespread use and both require constant check motion as noted above. The approach of superimposing flux reversals on a character as disclosed herein could give rise to a different more efficient character set. The invention has been disclosed in terms of a widely used character set to show that the inventive system would be consistent with that set.

What is claimed is:

1. A magnetic ink character decoder comprising a path of movement of a medium having a set of magnetic ink characters printed thereon, said decoder including means for superimposing magnetic flux reversals on said magnetic ink characteristics. wherein each of said magnetic ink characters includes vertical and horizontal elements and said flux reversals are aligned with said vertical elements in a manner to provide a sequence of relatively long flux reversals in each of said vertical elements and a sequence of relatively short flux reversals in each of said horizontal elements defined by the relatively long vertical dimensions of said vertical element and the relatively short vertical dimensions of said horizontal elements respectively, said sequence of long and short flux reversals being equally-spaced, unique for each of said characters, said decoder also including means for counting the sequence of flux reversals for producing a unique pulse sequence count for each of said characters and means for comparing said unique pulse sequence count to stored pulse sequence counts for a set of magnetic ink characters for determining a match therebetween.

2. A decoder in accordance with claim 1 wherein said means for superimposing includes a magnetic write head.

3. A decoder in accordance with claim 2 also including a magnetic read head positioned to respond to relatively long and relatively short flux reversals to provide a sequence of relatively high and relatively low amplitude pulse counts characteristic of each of said characters.

4. A decoder in accordance with claim 3 also including means for storing a unique sequence of pulse counts for each of said characters and means for comparing the output of said read head with the stored unique sequence of pulse counts for determining a match therebetween.

5. A decoder in accordance with claim 1 also including means responsive to a change in signal amplitude level for ending an instant pulse count and starting a next consecutive pulse count.

6. A method for decoding the characters of a set of magnetic ink characters on a medium, said method comprising the steps of generating a sequence of magnetic fields for forming on the vertical and horizontal elements of each said characters a number of equally-spaced flux reversals characteristic of said elements, moving said characters past a read head for generating equally-spaced signals representative of said characters, counting said signals to generate a unique sequence count for each of said characters, and comparing said unique sequence count to a set of stored sequence counts representative of each member of said set for obtaining a match.

7. A magnetic ink character decoder, said decoder comprising a read-after-write means, a slot for engaging a check having thereon a magnetic ink character set comprising a sequence of characters, said means being positioned to be magnetically coupled to the character set of a check being moved along said slot, said read-after-write means including means for writing on the characters of the magnetic ink character set on a check being moved in said slot a plurality of equally spaced flux reversals for encoding each of said characters with a characteristic pulse count sequence, said read-after-write means also including read means for detecting said characteristic pulse count sequence for the magnetic ink characters on a check being moved in said slot, said decoder also including means for storing a set of pulse count sequences for the characters of a magnetic ink character set and means for comparing the output pulse count sequence from said read means to said stored set of pulse count sequences for obtaining a sequence of matches therebetween.

8. A magnetic ink character decoder comprising a path for the movement of a medium having a set of magnetic ink characters printed thereon, each of said characters having characteristic vertical and horizontal elements and being defined within a prescribed area having a defined height and width, said decoder including means for generating a sequence of like magnetic fields for producing equally-spaced flux reversals over the width of each of said characters, each of said magnetic fields extending over said height such that the associated character responds to said fields to exhibit a characteristic set of flux reversals determined by said characteristic vertical and horizontal elements, said decoder also including means for counting the sequence of flux reversals for producing a unique pulse sequence count for each of said characters and means for comparing said unique pulse sequence count to stored pulse sequence counts for a set of magnetic ink characters for determining a match therebetween.

9. A decoder in accordance with claim 8 wherein said medium is a check, said decoder including means responsive to the movement of said check for generating equally spaced timing pulses.

10. A decoder in accordance with claim 8 wherein said decoder includes means responsive to the movement of said medium for generating equally spaced timing pulses and said means for generating a sequence of like magnetic fields is responsive to said timing pulses to provide equally spaced flux reversals.

* * * * *